(12) United States Patent
Mack

(10) Patent No.: US 6,595,527 B2
(45) Date of Patent: Jul. 22, 2003

(54) CHIP-CLEARING DRILL CHUCK

(75) Inventor: Hans-Dieter Mack, Sontheim (DE)

(73) Assignee: Rohm GmbH, Sontheim (DE)

( * ) Notice: Subject to any disclaimer, the term of this patent is extended or adjusted under 35 U.S.C. 154(b) by 0 days.

(21) Appl. No.: 10/056,345

(22) Filed: Jan. 25, 2002

(65) Prior Publication Data

US 2003/0067123 A1 Apr. 10, 2003

(30) Foreign Application Priority Data

Oct. 10, 2001 (DE) .......................... 101 49 959

(51) Int. Cl.[7] .............................................. B23B 31/12
(52) U.S. Cl. .......................................... 279/62; 279/157
(58) Field of Search .............................. 279/60, 61, 62, 279/63, 64, 65, 902, 157; 408/240

(56) References Cited

U.S. PATENT DOCUMENTS

| 4,498,682 A | * | 2/1985 | Glore | 279/61 |
|---|---|---|---|---|
| 4,627,628 A | * | 12/1986 | Rohm | 279/62 |
| 4,775,159 A | * | 10/1988 | Manschitz | 279/19.3 |
| 5,580,197 A | * | 12/1996 | Rohm | 279/61 |
| 5,590,985 A | * | 1/1997 | Mack | 279/61 |
| 5,829,761 A | * | 11/1998 | Rohm | 279/62 |
| 5,918,887 A | * | 7/1999 | Miles | 279/62 |
| 5,927,914 A | * | 7/1999 | Mack et al. | 408/240 |
| 6,045,141 A | * | 4/2000 | Miles et al. | 279/62 |
| 6,070,884 A | * | 6/2000 | Mack | 279/62 |
| 6,095,530 A | * | 8/2000 | Rohm | 279/62 |

* cited by examiner

Primary Examiner—Steven C. Bishop
(74) Attorney, Agent, or Firm—Herbert Dubno; Andrew Wilford

(57) ABSTRACT

A drill has a drive-unit housing having an end wall, a drive-unit spindle projecting along an axis from the wall, and a chuck body fixed to the spindle, formed with an axially forwardly open tool recess, and formed with a plurality of angled guide passages opening forward into the recess. Respective jaws displaceable in the passages are engageable in the recess with a tool. a rear plate mounted on the chuck body axially rearward of the jaws and projecting transversely of and closely axially juxtaposed with the housing end wall is formed with a hole communicating with at least one of the passages and having an outer end radially outside the end wall.

14 Claims, 3 Drawing Sheets

CHIP-CLEARING DRILL CHUCK

FIELD OF THE INVENTION

The present invention relates to a drill. More particularly this invention concerns such a drill chuck used on a power drill and constructed to clear itself of any chips or other particles generated by a drilling operation.

BACKGROUND OF THE INVENTION

A standard drill has a drive unit with a housing having an end wall from which a drive-unit spindle projects along an axis. A chuck body fixed to the spindle and formed with an axially forwardly open tool recess has a plurality of angled guide passages opening forward into the recess. Respective jaws displaceable in the passages are engageable in the recess with a tool. A rear plate mounted on the chuck body axially rearward of the jaws projects transversely of the housing end wall and is formed with a hole communicating with the recess and having an open outer end.

Thus particles that get into the chuck, for instance when drilling overhead when the tool recess is open upward, can work their way back and out of the chuck via the hole through the plate. Unfortunately these particles can then often get into the drive unit, fouling the bearing around the spindle and generally clogging the space between the chuck and the drive unit.

OBJECTS OF THE INVENTION

It is therefore an object of the present invention to provide an improved drill.

Another object is the provision of such an improved drill which overcomes the above-given disadvantages, that is which prevents particles from fouling the drive unit.

SUMMARY OF THE INVENTION

A drill has according to the invention a drive-unit housing having an end wall, a drive-unit spindle projecting along an axis from the wall, and a chuck body fixed to the spindle, formed with an axially forwardly open tool recess, and formed with a plurality of angled guide passages opening forward into the recess. Respective jaws displaceable in the passages are engageable in the recess with a tool. According to the invention a rear plate mounted on the chuck body axially rearward of the jaws and projecting transversely of and closely axially juxtaposed with the housing end wall is formed with a hole communicating with at least one of the passages and having an outer end radially outside the end wall.

Thus with this system rotation of the chuck will cause particles issuing from the hole to be centrifugally propelled outward, away from the mechanism. Since the hole opens radially outward of the end wall of the housing, it is impossible for particles to get into the drive unit.

According to the invention the end wall is an annular collar centered on the axis and having an annular front end closely axially juxtaposed with the rear plate. It has an axially forwardly tapered outer surface having a front edge lying radially inside an orbit defined by the outer hole end on rotation of the chuck. In this manner the collar outer surface will deflect any particles issuing from the hole radially outward. This outer surface is normally frustoconical to prevent any particles from lodging on it.

The rear plate is formed in accordance with the invention with an axially rearwardly open annular groove receiving the collar front end. More particularly it is formed with an axially rearwardly projecting circular ridge defining an outer flank of the groove. The rear plate is out of direct contact with the collar front end. Thus the interfitting collar and groove form a labyrinth or interference seal that prevents anything from entering the drive unit while still offering no significant resistance to rotation of the chuck on the drive unit.

The plate is formed according to the invention with one such hole for each of the guide passages, each hole communicating with the respective guide passage. Normally there are three passages, each holding a respective jaw, so that there are three angularly equispaced holes communicating with the jaw-guide passages Each of the holes extends relative to the axis at an acute angle open axially rearward. Thus centrifugal force propels the particles outward away from the drive unit.

The rear plate is formed between the holes with respective radially extending and axially projecting stiffening ribs allowing the groove to be fairly deep without weakening the plate. In addition this rear plate is fixed on the chuck body and has an axially forwardly projecting rim that serves as a grip point for the user of the chuck. Normally a sleeve on the chuck has a cylindrical outer surface level with that of the rim and can be rotated to move the jaws axially in the respective guide passages.

The holes according to the invention can open axially rearward or radially outward. In the latter case they are L-shaped.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
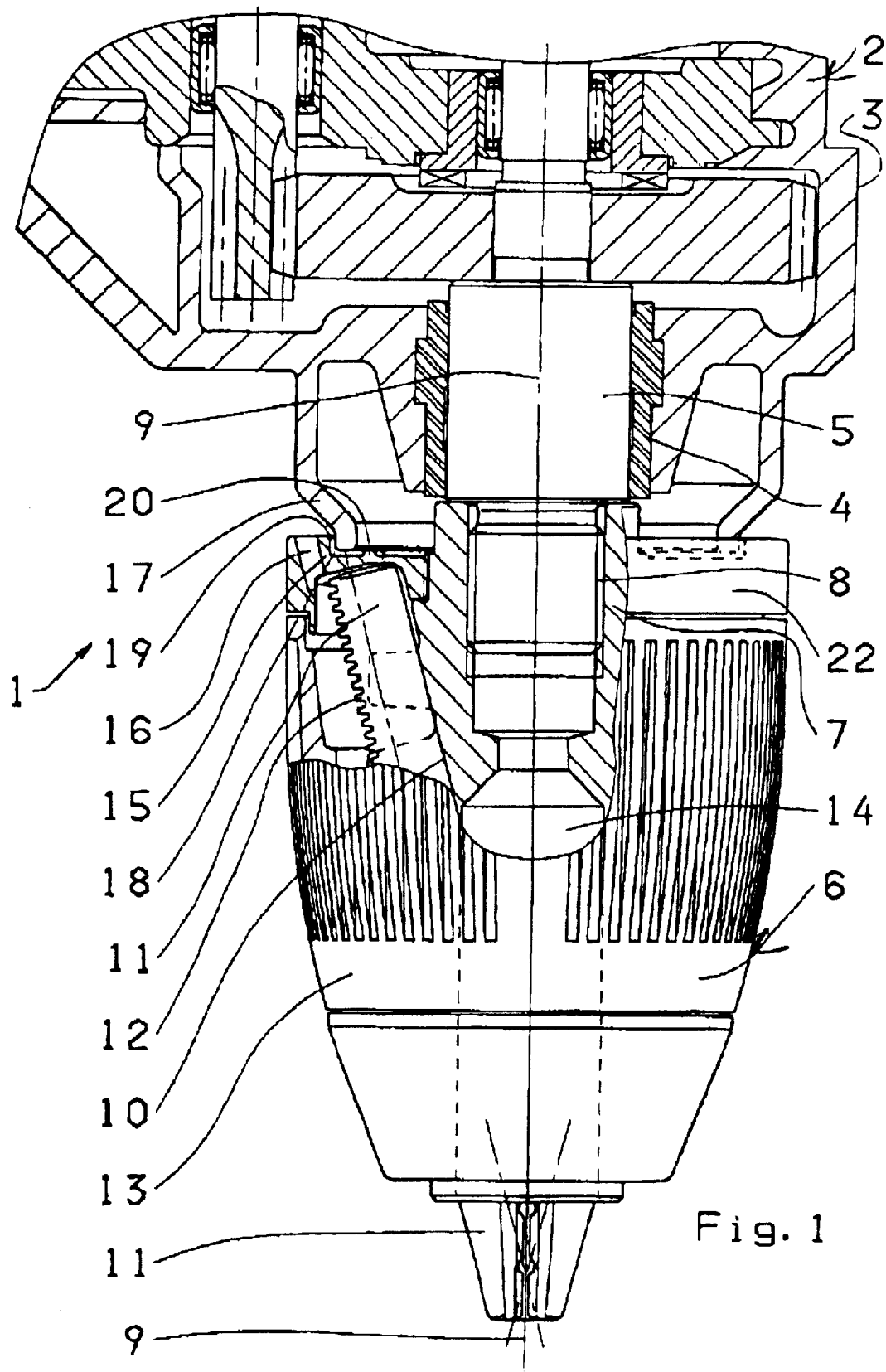
FIG. 1 is a partly sectional side view of the drill according to the invention.
Figure 2:
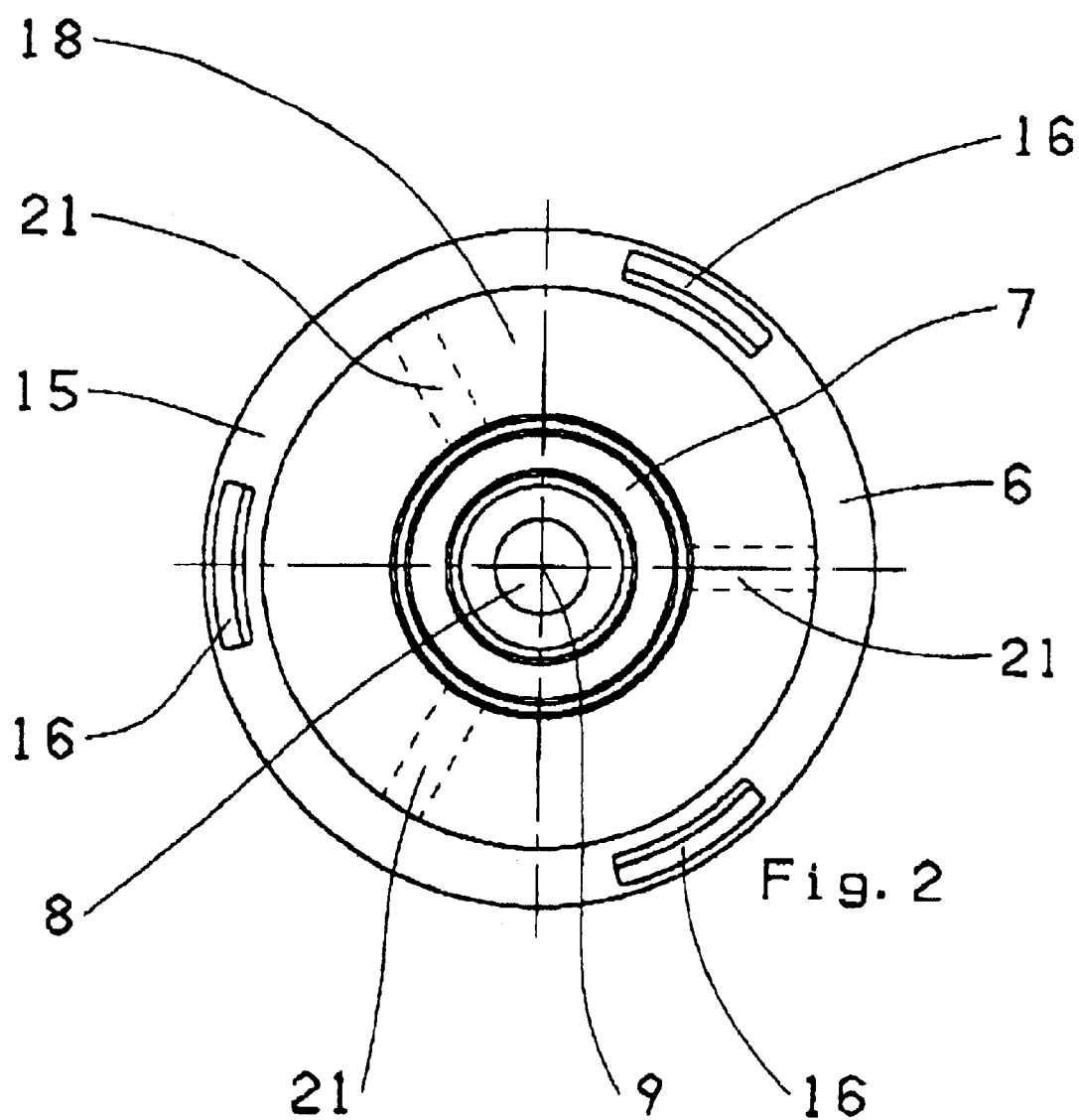
FIG. 2 is a rear-end view of the chuck.

As seen in FIGS. 1 and 2 a drill 1 has a power unit 2 with a housing 3 in which a spindle or shaft 5 is rotatable in a bearing 4 about an axis 9. A chuck 6 has a body 7 formed with a rearwardly axially open threaded bore 8 into which the spindle 5 is screwed so that the body 7 rotates jointly with the spindle 5 about the axis 9. The body 7 is formed with three angularly equispaced and angled guide passages 10 receiving respective jaws 11 having outer edges formed with teeth 12 meshing with an unillustrated internal screwthread on an unillustrated ring fixed in a sleeve 13 that can rotate on the body 7 about the axis 9 but that cannot move axially relative to the body 7. Thus, as is standard, rotation of the sleeve 13 in one direction relative to the body 7 will move the jaws 11 axially forward (down in FIG. 1) and radially together, and opposite rotation will move them axially backward and radially apart.

The body 7 is also formed with a forwardly open axially centered recess 14 into which the front ends of the jaws 11 project and in which a tool being gripped by the jaws 11 is inserted. This recess 14 communicates with the guide passages 10 holding the jaws 11 and there are spaces between and in back of the jaws 11 so that during use, particularly when drilling overhead, particles generated by the drilling operation fall down into the recess 14 and work their way back in the chuck 6 via the guide passages 10.

The rear end of the chuck 6 is closed by a rear cover plate 15 formed with three angularly equispaced axially throughgoing holes 16. In accordance with the invention these holes 16 are provided near the outer periphery of the plate 15 and the axial rear end of each of the guide passages 14 opens into the respective hole 16, with the holes 16 inclined somewhat radially outward. In addition this plate 15 is formed radially inward of the holes 16 with an axially rearwardly open groove 18 defined between an annularly continuous outer rim or wall 19 and an annularly continuous inner rim or wall 20. The housing 3 of the power unit 2 itself has an annular forwardly projecting collar or rim 17 that projects down into this groove 18 and that has an axially frustoconically forwardly tapering outer surface so that any particles issuing from the holes 16 will be deflected radially outward, away from the drill 1.

The cover plate 15 is formed between the holes 16 with three axially forwardly projecting and radially extending stiffening ribs 21. In addition it has at its outer periphery an axially forwardly extending rim 22 whose cylindrical outer surface is level with the outer surface of the tightening sleeve 13 and, since the plate 15 is splined to the body 7, this rim 22 serves as a good place to hold the chuck 6 while adjusting the jaws 11.

Thus with this system any particles that work their way back into the recess 14 and thence into the passages 10 will be driven centrifugally out the holes 16 to exit from the chuck 6 outside the rim 17 of the power unit 2. Thus these particles will be shed harmlessly and will not foul any delicate mechanism.

Figure 3:
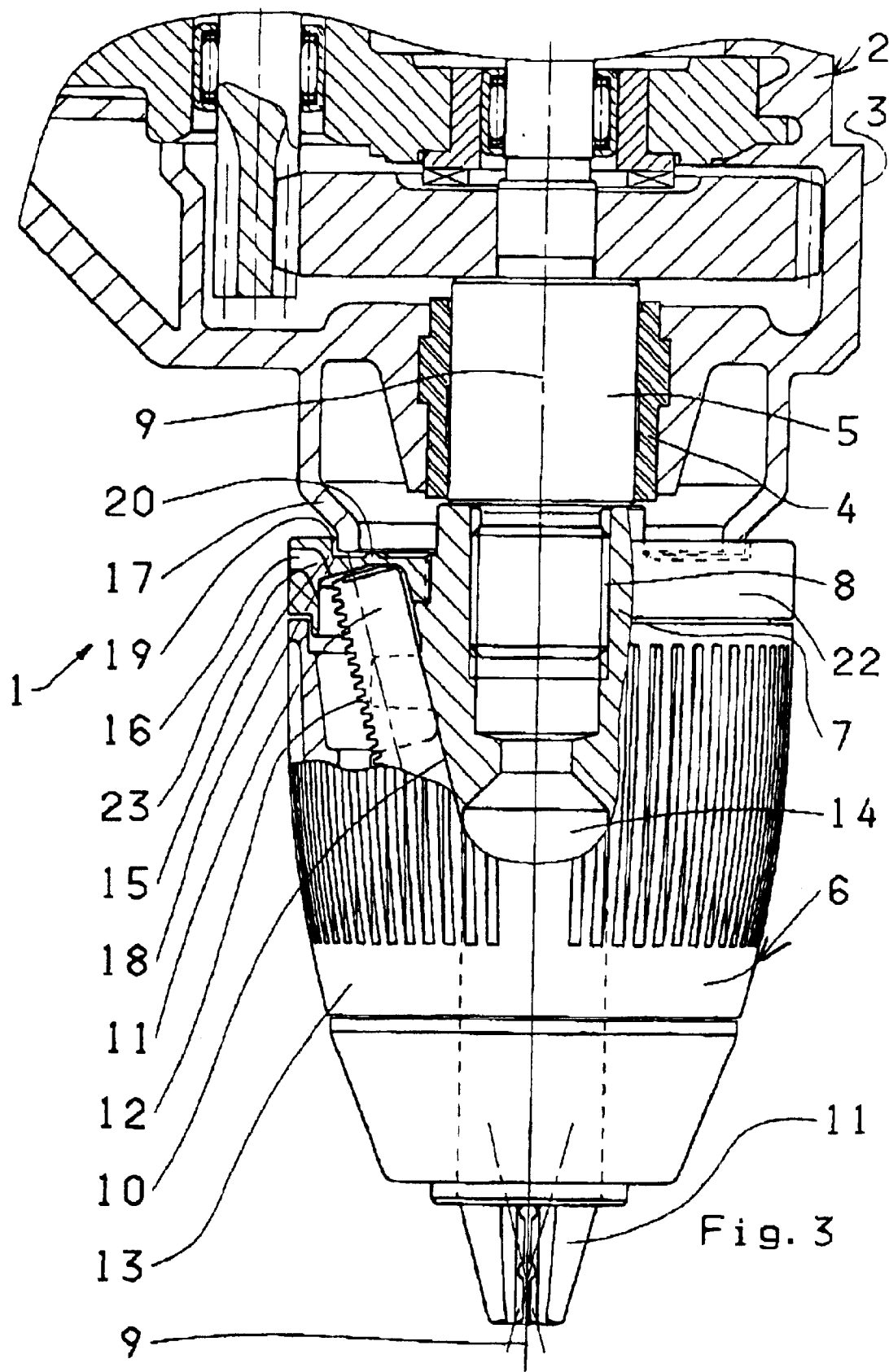
FIG. 3 is a view like FIG. 1 of a variant of the drill in accordance with the invention.

In the system of FIG. 3 the structure is essentially identical, except that holes 16' open radially outward on the cylindrical outer surface of the rim 22 of the plate 15, and passages 23 leading from the guide passages 10 to the holes 16' are basically L-shaped. Thus the particles are ejected radially from the chuck 6 as it rotates.

I claim:

1. A drill comprising:
    a drive-unit housing having an end wall having an annular front end;
    a drive-unit spindle projecting along an axis from the end wall and surrounded by the housing front end;
    a chuck body fixed to the spindle, formed with an axially forwardly open tool recess, and formed with a plurality of angled guide passages opening forward into the recess;
    respective jaws displaceable in the passages and engageable in the recess with a tool; and
    a rear plate mounted on the chuck body axially rearward of the jaws, projecting transversely of the axis, closely axially juxtaposed with the housing front end, and formed with a hole opening forward into at least one of the passages and having a rear end opening radially outside the housing front end.

2. The drill defined in claim 1 wherein the end wall is an annular collar centered on the axis and forming the housing front end.

3. The drill defined in claim 2 wherein the annular collar has an axially forwardly tapered outer surface having a front edge lying radially inside an orbit defined by the rear hole end on rotation of the chuck.

4. The drill defined in claim 3 wherein the rear plate is formed with an axially rearwardly open annular groove receiving the collar front end.

5. The drill defined in claim 4 wherein the rear plate is formed with an axially rearwardly projecting circular ridge defining an outer flank of the groove.

6. The drill defined in claim 3 wherein the rear plate is out of direct contact with the collar front end.

7. The drill defined in claim 1 wherein the rear plate is formed with a plurality of the holes each communicating with a respective one of the guide passages.

8. The drill defined in claim 7 wherein each of the holes extends relative to the axis at an acute angle open axially rearward.

9. The drill defined in claim 7 wherein the rear plate is formed between the holes with respective radially extending and axially projecting stiffening ribs.

10. The drill defined in claim 1 wherein the rear plate is fixed on the chuck body.

11. The drill defined in claim 10 wherein the rear plate has an axially forwardly projecting rim.

12. The drill defined in claim 1 wherein the holes open axially rearward.

13. The drill defined in claim 1 wherein the holes open radially outward.

14. The drill defined in claim 13 wherein the holes are L-shaped.

* * * * *